(12) United States Patent
Caspers et al.

(10) Patent No.: US 6,507,730 B1
(45) Date of Patent: Jan. 14, 2003

(54) COMMUNICATION DEVICE AND A METHOD FOR SIMULTANEOUS TRANSMISSION OF SPEECH AND DATA

(75) Inventors: Alfred Caspers, Limburg (DE); Norbert Roettger, Waldmuehlen (DE)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/483,373

(22) Filed: Jan. 14, 2000

(30) Foreign Application Priority Data

Jan. 15, 1999 (DE) .......................................... 199 01 328

(51) Int. Cl.⁷ .............................................. H04B 11/00
(52) U.S. Cl. ........................................ 455/103; 455/569
(58) Field of Search ................... 455/461, 462, 455/463, 307, 266, 73, 74, 569, 570, 93, 105, 45, 186.1, 345, 132, 133, 143, 218, 219, 103

(56) References Cited

U.S. PATENT DOCUMENTS

| | | | | |
|---|---|---|---|---|
| 4,020,421 A | * | 4/1977 | Elder et al. .................. 325/478 |
| 4,280,020 A | * | 7/1981 | Schnurr .................... 179/2 EA |
| 4,423,416 A | * | 12/1983 | Bailey et al. .......... 340/825.52 |
| 4,716,576 A | * | 12/1987 | Sakai et al. ..................... 375/5 |
| 4,931,871 A | * | 6/1990 | Kramer ...................... 358/142 |
| 4,945,412 A | * | 7/1990 | Kramer ...................... 329/345 |
| 5,001,757 A | * | 3/1991 | Field et al. ..................... 381/13 |
| 5,146,612 A | * | 9/1992 | Grosjean et al. ............... 455/45 |
| 5,301,369 A | * | 4/1994 | Simmons et al. .............. 455/79 |
| 5,491,838 A | * | 2/1996 | Takahisa et al. .............. 455/66 |
| 5,850,610 A | * | 12/1998 | Testani et al. .............. 455/512 |
| 6,081,699 A | * | 6/2000 | Kancko .................... 455/186.1 |

FOREIGN PATENT DOCUMENTS

| | | | | |
|---|---|---|---|---|
| DE | 1235984 | * | 3/1967 | |
| EP | 0 138 988 | * | 2/1991 | ............. H04J/1/20 |
| WO | WO 83/01875 | * | 5/1983 | ............. H04B/1/10 |

* cited by examiner

Primary Examiner—Edward F. Urban
Assistant Examiner—Naghmeh Mehrpour
(74) Attorney, Agent, or Firm—Terri S. Hughes

(57) ABSTRACT

A communication device (100) including a receiver (110), a demodulator (120), a frequency dependent LF amplifier (130) as well as a frequency dependent decoder (150) receives a HF signal (105) onto which speech information and data information are modulated on a single carrier. The LF signal (125) provided from demodulator (120) includes two separated frequency bands for speech and data. The amplifier (130) makes audible the speech via a speaker (140) and the decoder (150) evaluates the data information, displays the same at a display (160) and controls the amplifier (150,155), respectively.

10 Claims, 3 Drawing Sheets

COMMUNICATION DEVICE AND A METHOD FOR SIMULTANEOUS TRANSMISSION OF SPEECH AND DATA

FIELD OF THE INVENTION

The present invention generally relates to communication devices, and in particular to radio devices receiving simultaneously speech and data.

BACKGROUND OF THE INVENTION

Communication devices (transmitter and/or receiver) are usually designed either as devices for speech transmission ("speech devices", e.g. telephones) or as devices for data transmission ("data devices", e.g. selective pager). The term "speech" is used in this description as a representation for all information (speech, music, morse code, and the like) which can be transmitted acoustically in the audible frequency range (e.g. 16 Hz to 16 kHz, dependent on the person) to a user. The term "data" will be used in this description for all other information. However, the usual differentiation in speech devices and data devices does not exclude that speech devices should as well transmit data in a certain smaller extent (e.g. short messages in mobile telephones) and data devices should transmit as well speech (e.g. telephone communication via data networks).

Therefore, there is a need for combined speech and data devices. Such devices are realized according to the prior art as follows:

speech and data can be transmitted sequentially (time multiplex) via one transmission channel. For instance an analogue telephone line or a radio channel transmits either speech or data but not both, speech and data, at the same time. The speech communication is excluded at the time of a data transmission and vice versa. Noises which usually occur with the coding of data in the channel in the audible range ("modem noise") are perceived as disturbing by the user.

speech and data can be transmitted essentially simultaneously by means of extensive digital coding at the transmitter side and similarly extensive decoding at the receiver side. Examples are telephone systems according to the ISDN standard (Integrated Service Digital Network) or digital mobile radio telephones (e.g. GSM standard).

FM broadcast transmitters code data (e.g. weather messages, traffic messages) on subcarriers transmitted parallel to the main broadcast program (speech). Large decoders are necessary at the receiver side. Additionally, the communication is possible in one direction only.

Means for analogue radio devices are known under the names "private line" (PL) and "digital private line" (DPL), by means of which the transmitter adds a pilot sound detected and evaluated at the receiver side, wherein the speaker at the receiver side can be switched selectively on and off. Such means have a protection function and avoid the transmission of speech to persons who do not want to listen or who should not hear the corresponding speech. A useful documentation is the following handbook: "Motorola Inc, Schaumburg, Ill., 'Digital Private-Line', Binary-Coded Squelch, Theory and Servicing Fundamentals, Reference Manual 68P81106E83-A, 1975".

There is a need to provide an improved communication device for simultaneous transmission of speech and data.

DETAILED DESCRIPTION OF A PREFERRED EMBODIMENT

Figure 1:
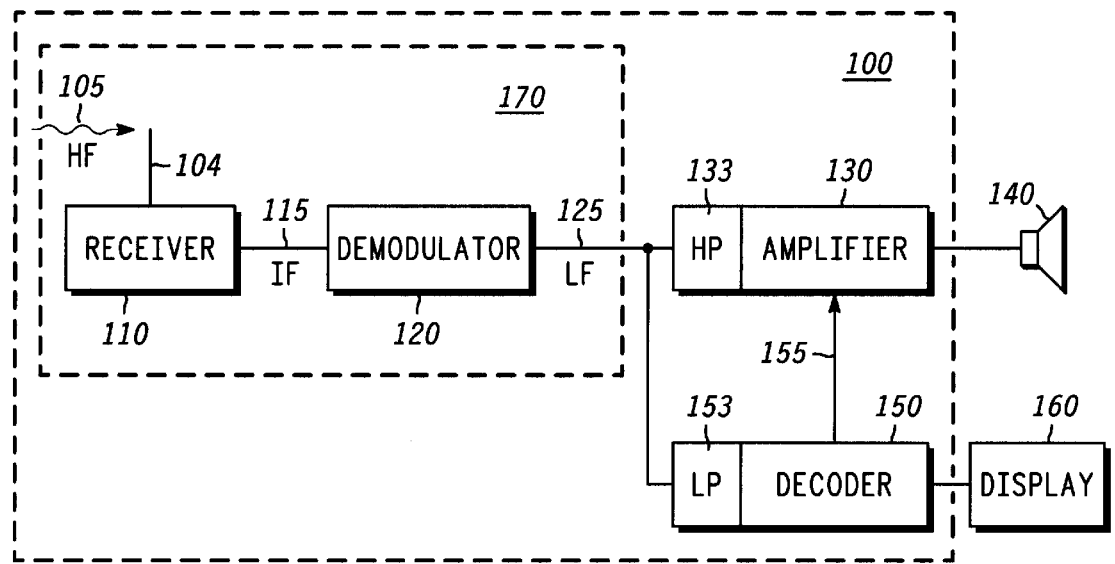
FIG. 1 shows in a simplified illustration a block diagram of a first communication device according to the present invention.

FIG. 1 shows in a simplified illustration the block diagram of a communication device 100 (in the following referred to as "device 100") according to the present invention. Device 100 (chain-dotted frame) includes beside others a receiver 110 (optionally with antenna 104), a demodulator 120, an amplifier 130 (optionally with high pass "HP" 133), and a decoder 150 (optionally with low pass "LP" 153). An electro-acoustic converter 140 (e.g., a speaker) and a display 160 (e.g., a LCD) are optionally connectable to device 100 or integrated in device 100. Device 100 serves for simultaneously transmitting information in a first form (e.g., speech) and in a second form (e.g., data). As defined above, "speech" includes also music for example. To ease the understanding, in the following the terms "speech" (speech form) and data (data form) are used as appropriate terms for the first and second forms, respectively, or vice versa. The term "transmitting" includes, as it is used in this description "receiving" (as shown) as well as "transmitting" (in the sense of emitting a signal). Although FIG. 1 shows device 100 only in the operation mode "receiving", in order to simplify the representation, the skilled person can provide device 100, based on the present description, as well with a transmitting function (refer to FIG. 5) without the need for further explanations in this respect. A communication device for transmitting (emitting) is explained further below (FIG. 6).

Receiver 110 receives a high frequency signal 105 (in the following referred to as "HF signal") in which information in speech form and data form are modulated on a single carrier. Preferably, receiver 110 receives HF signal 105 as a radio signal via antenna 104. Receiver 110 converts HF signal 105 in an intermediate frequency signal 115 (in the following referred to as "IF signal").

Demodulator 120 demodulates IF signal 115 into a low frequency signal 125 (in the following referred to as "LF signal". Terms HF, IF and LF used herein are common in the literature and described, beside others, as HF for HF, ZF for IF and NF for LF in: "Meinke/Gundlach: Taschenbuch der Hochfrequenztechnik, $5^{th}$ revised edition, Springer-Verlag, Berlin, Heidelberg, N.Y., ISBN 3-540-54717-7".

The use of an IF signal is advantageous, however, it is not necessary for the present invention. Generally, receiving portion 170 (chain-dotted frame) is sufficient for the reception of the HF signal 105 and the demodulation of HF signal 105 into LF signal 125.

According to the present invention, LF signal 125 represents the information in the first form (i.e., speech) in a first frequency band and the information in a second form (i.e., data) in a second frequency band. Preferably, the speech signal is an analogue signal and the data signal is a digital signal. Details are shown more detailed in the signal spectrum of FIG. 2. Amplifier 130 is frequency dependent (e.g. with high pass 133) and can make audible the information represented with the first band (e.g. via converter 140). Demodulator 150 is also frequency dependent (e.g. with low pass 153 at the input) and can display the information represented with the second band (e.g. via display 160) or process the information otherwise.

Preferably, device 100 comprises also a channel protection function, wherein decoder 150 uses a part of the data information (refer to 305, 310, 320 in FIG. 4) to control amplifier 130 via control line 155 such that the speech information are either made audible or suppressed.

Figure 2:
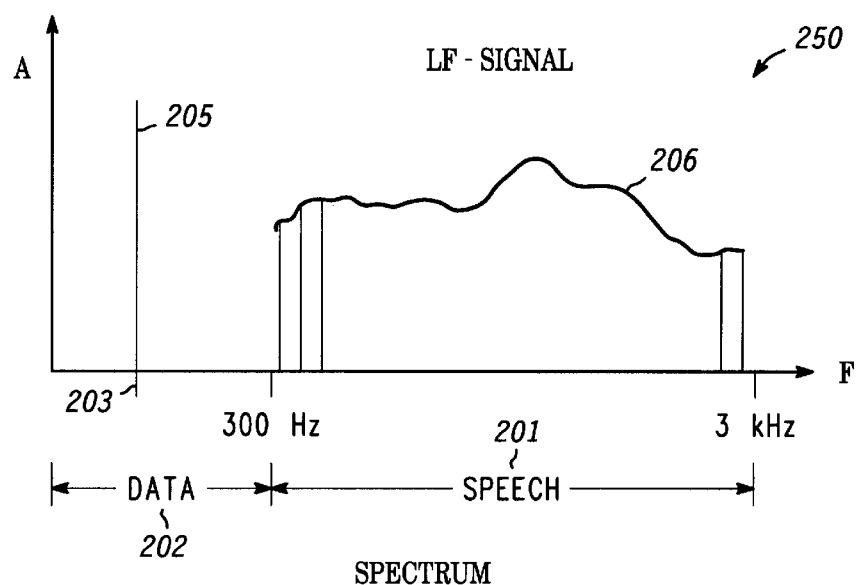
FIG. 2 shows in a simplified illustration a spectrum of a low frequency signal (LF) provided by a demodulator of the communication device of FIG. 1.

FIG. 2 shows in a simplified representation a spectrum 250 of LF signal 125 provided by demodulator 120 of device 100 (FIG. 1). Spectrum 250 shows a mean signal amplitude A of LF signal 125 (ordinate axis) in relation to its frequency F (abscissa axis). FIG. 2 does not claim to be in true scale. Preferably, a (first) frequency band 201 and a (second) frequency band 202 are non-overlapping, wherein frequency band 201 is preferably above frequency band 202. Usual frequency values F are in the ranges of $300\ Hz \leq F \leq 3\ kHz$ (band 201, speech) and $0 \leq F \leq 300\ Hz$ (band 202, data). These values are not necessary for the present invention. The skilled person can use other values or interchange the bands. An enveloping curve 206 with the discrete spectrum lines indicated below symbolizes the speech information. A line 205 symbolizes the mean amplitude of a bit sequence (details in FIGS. 3 and 4) for data information. According to the present invention, the bit sequence is transmitted advantageously on a single data frequency 203 (within band 202). This is advantageous but no condition. Data can be as well transmitted using plural spectrum lines.

Figure 3:
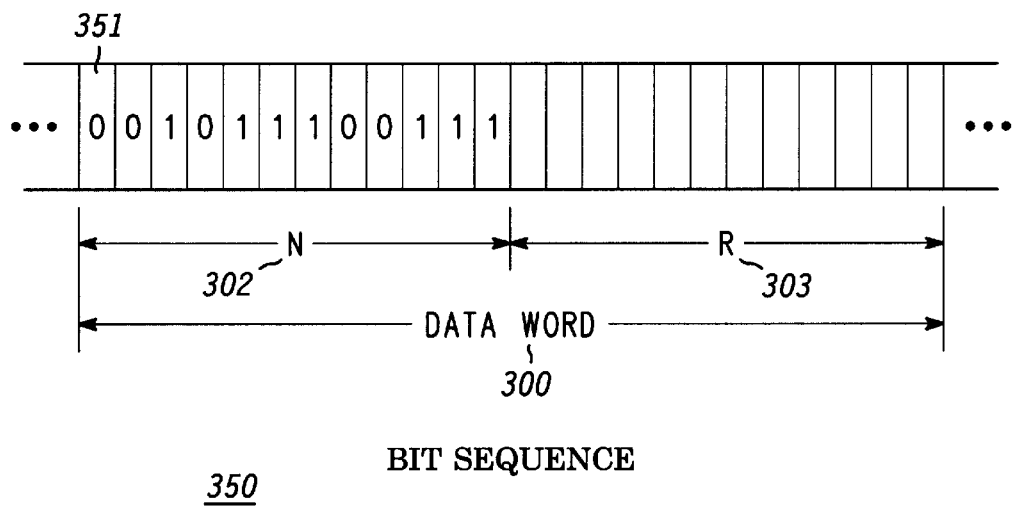
FIG. 3 shows in a simplified illustration a bit sequence by means of which the communication device of FIG. 1 processes data.

FIG. 3 shows in a simplified illustration a bit sequence 350, by means of which device 100 (FIG. 1) processes data. In this form, decoder 150 deducts the data information from the LF signal 125 (e.g., low pass filtering). Bit sequence 350 is a sequence of bits 351 (logical "1"s and "0"s), wherein for a single bit 351 a specific transmission time (if expressed inversely, a bit rate) is predetermined. For instance, at a data frequency (refer to 203 in FIG. 2) of F=133 Hz, 133 bits 351 can be transmitted per second. Bit sequence 350 is divided into periodically recurring data words 300. A data word 300 includes preferably N load bits 302 (e.g., N=12) and R redundancy bit 303 (e.g., R=11). Usually, the load and redundancy bits are coded in a cyclic or in a sequential code (e.g., Golay, BCH or others), wherein decoder 150 evaluates the received bit sequence 350 and secures that the load bits 302 correspond with the greatest possible likelihood (maximum likelihood) to the data to be transmitted via signal 105 (refer to FIG. 1).

Figure 4:
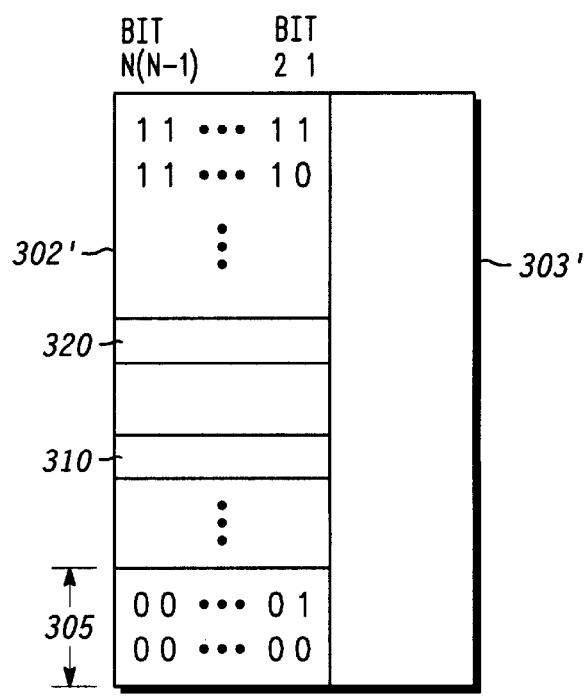
FIG. 4 shows in a simplified illustration a set of possible load bit combinations in the bit sequence of FIG. 3.

FIG. 4 shows in a simplified illustration a set of $2^N$ possible load bit combinations 302' in bit sequence 350 (FIG. 3). FIG. 4 shows as well the set of possible redundancy bit combinations 303'. The description is restricted to load bits. For the purpose of simplification, only bits 1 and 2 as well as bits N and N−1 are shown with 1s (above) or 0s (below). subset 305 (e.g. $2^6$=64 or less bits) includes combinations used for the selective switching on/off of a converter 140 making the speech information audible. In other words, if the decoder detects a predetermined combination out of set 350, converter 140 is switched on (loud) or of (silent) in response.

However, it is possible as well to perform the switching between the operation modes LOUD and SILENT by specific bit combinations (e.g., areas 310 and 320 excluding each other), wherein the selected operation mode is maintained, even if these bit combinations do not occur anymore. Advantageously, the other combinations can be used for other purposes (examples below).

In other words, at the occurrence of a data word 300 out of a first predetermined set 310, decoder 150 switches device 100 into a first state (e.g. "LOUD"), in which the speech information is made audible, even if the data word 300 is not applied anymore.

Or, at the occurring of a data word 300 out of a second predetermined set 320, decoder 150 switches device 100 into a second state (e.g., "SILENT"), in which the speech information is not made audible, even if the data word 300 is not applied anymore.

Figure 5:
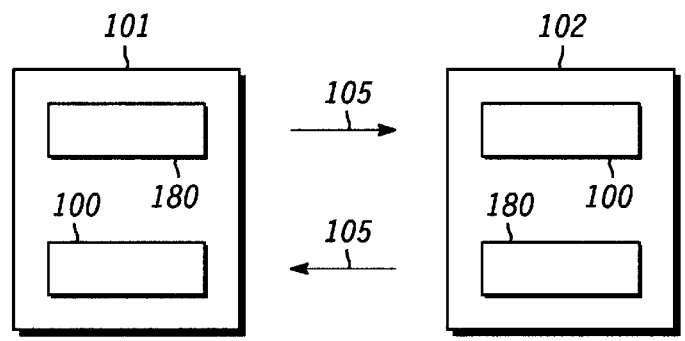
FIG. 5 shows in a simplified block diagram of a system of combined transmitting and receiving devices as an application example of the present invention.
Figure 6:
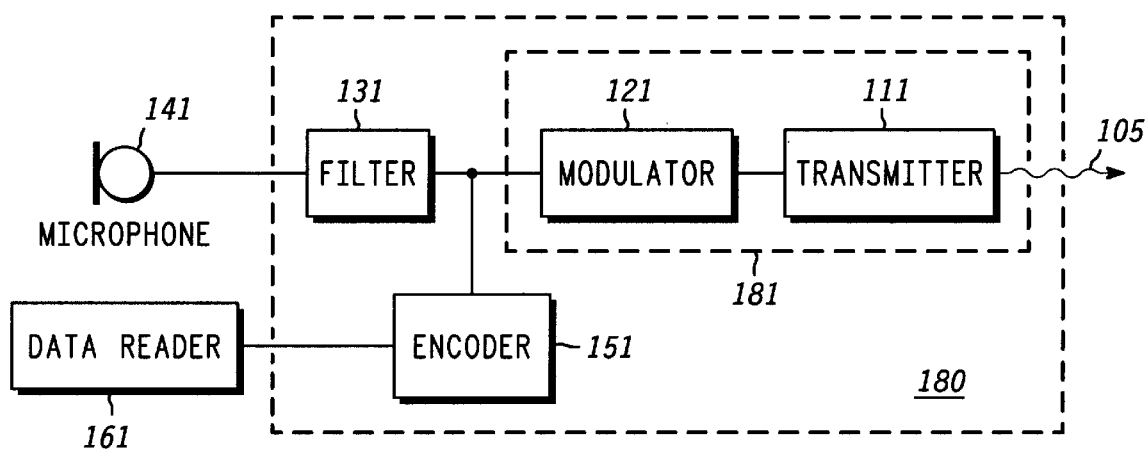
FIG. 6 shows a simplified block diagram of a second communication device in the system of FIG. 5.

FIG. 5 shows a simplified block diagram of a system of combined transmitting and receiving devices 101 and 102, each including receiving devices 100 (refer to FIGS. 1–4) as well as transmitters 180. System 101/102 represents an application example for the present invention, which is still expandable. Transmitter 180 provides radio signals 105 (refer to FIGS. 1, 6). The skilled persons are able to design such transmitters. An example is explained in connection with FIG. 6. By means of the above-indicated data transmission according to the present invention, devices 101 and 102 can inform each other on the best transmitting frequencies for each of signals 105. In other words, exchanged data can include commands for a change of the HF receiving frequency.

FIG. 6 shows a simplified block diagram of a communication device 180 (chain-dotted frame) in the system of FIG. 5, which is a supplement for device 100. However, communication device 180 can also be implemented as an independent device. Device 180 serves for simultaneously transmitting information in the first form and in the second form. Device 180 is connectable to a microphone 140 for recording the information in the first form and connectable to a data reader 141 for recording the information in the first form and connectable to a data reader 161 for reading the information in the second form. Microphone 141 is connectable to filter unit 131 and limits the information in the first form to a frequency band 201 in the LF range (FIG. 2). An encoder 151 is connectable to data reader 161 and encodes the information in the second form on frequency band 202 (separated, see FIG. 2). A transmitting unit 181 is connected to a filter unit 131 and encoder 151 and modulates the information in both forms onto a single carrier of HF transmitting signal 105 (refer to FIGS. 1, 5). The transmitting unit 181 is comprised appropriately of modulator 121 and transmitter 111.

The present invention can also be described as a communication method in a radio device 100, comprising the following steps: receiving a HF signal 105 on which speech and data information are modulated on a single carrier (e.g., frequency modulation of speech signal and frequency keying of the data signal, e.g., both on a carrier frequency of 160 MHz);

demodulating the HF signal into a LF signal (preferably via IF signal 115), wherein the speech and data information are accommodated in two separated frequency bands 201 and 202, respectively;

frequency dependent amplifying of frequency band 101 and making audible the speech information; and frequency dependent evaluation of frequency band 202 for deducting the data information.

The present invention excels in comparison to the prior art by the following advantages, beside others:

In comparison to cellular mobile radio (e.g., according to the GSM standard) wherein a large infrastructure (e.g., network of base stations) is necessary for the transmission of speech and data, the communication devices 100 according to the present invention do not need an infrastructure. Data can be transmitted in both directions, for instance, between devices 101 and 102 (refer to FIG. 5). Speech transmissions are not influenced by simultaneous data transmission. In other words, users are not disturbed by noises, which occur in conventional data transmission in speech breaks (e.g., modem noise in time multiplex to speech). Thus, the user comfort of the device is increased. A plurality of radio devices, such as devices 101, 102 in FIG. 5 can be connected to a network exchanging status information via the data function (service channel). Such networks do not need an expensive infrastructure and are very interesting in particular for small and midsize entities for this reason. There are resulting new application possibilities for analogue radio devices, for which in many countries a general operation permission is present. It has to be expected that such devices play an increasing part on the consumer market as bargain or cheap products. The transmission of data beside the speech opens, beside others, new marketing possibilities for radio devices in the leisure time area (e.g., sports, tourism, home electronics, and so on). As one example for an application in the home area, radio earphones are indicated. Beside the wireless transmission (e.g., radio signal 105 on a transmitting frequency of approximately 148 MHz or 433–434 MHz) of speech and music, respectively (first information form, in the frequency range of audible sound) from the broadcast device and TV device, respectively, to the earphone (i.e., device 100), a fixed line telephone or mobile telephone can inform the user on an incoming call (in the earphone a buzzing signal is generated) and mute the earphone, respectively, via data transmission (same transmitting frequency for data signals, second information form), if an incoming call is received. By an intended timed coordination of speech and data, orally presented information (speech) can be supported by visual data display (alpha numerical, symbols, pictograms). For instance, museum visitors could hear explanations on the presented exhibits via converter 140 (e.g., earphones) and read at the same time dates and/or names on display 160 (e.g., LCD 160), by means of device 100. Existing communication devices, in which the present invention is not yet implemented, can be used at least for the speech communication in the future as well. In other words, device 100 is downward compatible to existing transmission formats. By the present invention, the two demands for channel protection (receiver selection) on one hand and for simultaneous data transmission on the other hand, which seem to exclude each other, can be combined.

While the invention has been described in terms of particular structures, devices and methods, those of skill in the art will understand based on the description herein that it is not limited merely to such examples and that the full scope of the invention is properly determined by the claims that follow.

What is claimed is:

1. A communication device for simultaneous transmission of information in a first form of speech or music information and in a second form of data in a bit sequence code, the communication device comprising:

a receiving portion with an antenna for receiving a first high frequency (HF) signal on which the information in the first form and in the second form are modulated on a single carrier, the receiving portion demodulating the HF signal into a low frequency (LF) signal, wherein the LF signal represents the information in the first form in a first frequency band in the range from 300 Hz to 300 kHz and the information in the second form on a single frequency in a second frequency band in the range from 0 Hz to 300 Hz that is non-overlapping with the first frequency band, a frequency dependent amplifier having a high pass for making audible the information represented by the first frequency band is provided, and a frequency dependent decoder for displaying the information represented by the second frequency band is provided, wherein the frequency dependent decoder deducts the information in the second form from the LF signal as data words each comprising N load bits and R redundancy bits, and wherein the frequency dependent decoder, at the occurrence of a data word out of a second predetermined set, switches the communication device to a second state, wherein the information in the first form is not made audible, even if the data word is not applied anymore.

2. The communication device according to claim 1, wherein the decoder uses a part of the information in the second form to control the amplifier such that the information in the first form is either made audible or suppressed.

3. The communication device according to claim 1, wherein the data word each comprise N=12 load bits and R=11 redundancy bits, provided with a bit rate of 133 bits per second.

4. A communication device for simultaneous transmission of information in a first form of speech or music information and in a second form of data in a bit sequence code, the communication device comprising:

a receiving portion with an antenna for receiving a first high frequency (HF) signal on which the information in the first form and in the second form are modulated on a single carrier, the receiving portion demodulating the HF signal into a low frequency (LF) signal, wherein the LF signal represents the information in the first form in a first frequency band in the range from 300 Hz to 300 kHz and the information in the second form on a single frequency in a second frequency band in the range from 0 Hz to 300 Hz that is non-overlapping with the first frequency band, a frequency dependent amplifier having a high pass for making audible the information represented by the first frequency band is provided, and a frequency dependent decoder for displaying the information represented by the second frequency band is provided, wherein the frequency dependent decoder deducts the information in the second form from the LF signal as data words each comprising N load bits and R redundancy bits, and wherein a subset of $2^6=64$ load bit combinations out of $2^N$ possible load bit combinations are used for selectively switching loud and silent an electro-acoustic converter which makes audible the information in the first form.

5. A communication device for simultaneous transmission of information in a first form of speech or music information and in a second form of data in a bit sequence code, the communication device comprising:

a receiving portion with an antenna for receiving a first high frequency (HF) signal on which the information in the first form and in the second form are modulated on a single carrier, the receiving portion demodulating the HF signal into a low frequency (LF) signal, wherein the LF signal represents the information in the first form in a first frequency band in the range from 300 Hz to 300 kHz and the information in the second form on a single frequency in a second frequency band in the range from 0 Hz to 300 Hz that is non-overlapping with the first frequency band, a frequency dependent amplifier having a high pass for making audible the information represented by the first frequency band is provided, and a frequency dependent decoder for displaying the information represented by the second frequency band is provided, wherein the frequency dependent decoder deducts the information in the second form from the LF signal as data words each comprising N load bits and R redundancy bits, and wherein the decoder, at the occurrence of a data word out of a first predetermined set, switches the communication device to a first state, wherein the information in the first form is made audible, even if the data word is not applied anymore.

6. The communication device according to claim 1, wherein the data words are evaluated according to a cyclic code.

7. The communication device according to claim 1 being a radio device.

8. The communication device according to claim 2 receiving—on the same carrier—speech or music information from a broadcast device and information in the data form from a telephone, so that for incoming phone calls, the speech or music information is muted.

9. The communication device according to claim 1, wherein the communication device for transmitting has a microphone for receiving the information in the first form and a data reader for reading the information in the second form, a filter unit connectable to the microphone for limiting the information in the first form to the first frequency band in the LF range, an encoder connectable to the data reader for encoding the information in the second form to the second frequency band, and a transmitter connected to the filter unit and to the encoder for modulating the information in both forms on the single carrier of the HF signal for transmitting.

10. A communication system comprising a first combined transmitting and receiving device and a second combined transmitting and receiving device, wherein each of the combined transmitting and receiving devices includes a communication device for receiving and a communication device for transmitting, wherein the communication device for receiving has a receiving portion with an antenna for receiving a first high frequency (HF) signal on which the information in a first form of speech or music and in a second form of sequential data is modulated on a single carrier, the receiving portion demodulating the HF signal into a low frequency (LF) signal, wherein the LF signal represents the information in the first form in a first frequency band in the range from 300 Hz to 300 kHz and the information in the second form on a single frequency in a second frequency band in the range from 0 Hz to 300 Hz that is non-overlapping with the first frequency band, a frequency dependent amplifier having a high pass for making audible the information represented by the first frequency band is provided, a frequency dependent decoder for displaying the information represented by the second frequency band is provided;

wherein the communication device for transmitting has a microphone for receiving the information in the first form and a data reader for receiving the information in the second form, a filter unit connectable to the microphone for limiting the information in the first form to the first frequency band in the LF range, an encoder connectable to the data reader for encoding the information in the second form to the second frequency band, and a transmitter connected to the filter unit and to the encoder for modulating the information in both forms on the single carrier of the HF signal for transmitting; and wherein the frequency dependent decoder deducts the information in the second form from the LF signal as data words each comprising N load bits and R redundancy bits, and wherein the frequency dependent decoder, at the occurrence of a data word out of a second predetermined set, switches the communication device to a second state, wherein the information in the first form is not made audible, even if the data word is not applied anymore.

* * * * *